US012267910B2

(12) United States Patent
Wu et al.

(10) Patent No.: US 12,267,910 B2
(45) Date of Patent: Apr. 1, 2025

(54) SIDELINK RELAY SELECTION AND RE-SELECTION IN WIRELESS COMMUNICATION

(71) Applicant: Apple Inc., Cupertino, CA (US)

(72) Inventors: Zhibin Wu, Los Altos, CA (US); Chunxuan Ye, San Diego, CA (US); Dawei Zhang, Saratoga, CA (US); Haijing Hu, Beijing (CN); Haitong Sun, Irvine, CA (US); Wei Zeng, San Diego, CA (US)

(73) Assignee: Apple Inc., Cupertino, CA (US)

( * ) Notice: Subject to any disclaimer, the term of this patent is extended or adjusted under 35 U.S.C. 154(b) by 276 days.

(21) Appl. No.: 17/686,172

(22) Filed: Mar. 3, 2022

(65) Prior Publication Data

US 2022/0322194 A1 Oct. 6, 2022

Related U.S. Application Data

(60) Provisional application No. 63/169,113, filed on Mar. 31, 2021.

(51) Int. Cl.
*H04W 8/00* (2009.01)
*H04W 36/30* (2009.01)
(Continued)

(52) U.S. Cl.
CPC ......... *H04W 8/005* (2013.01); *H04W 36/302* (2023.05); *H04W 52/383* (2013.01); *H04W 88/04* (2013.01); *H04W 92/18* (2013.01)

(58) Field of Classification Search
CPC ............... H04B 17/318; H04B 17/382; H04W 52/242; H04W 52/243; H04W 36/302
See application file for complete search history.

(56) References Cited

U.S. PATENT DOCUMENTS 11,191,036 B2\* 11/2021 Cai ..................... H04W 52/243
11,303,352 B2\* 4/2022 Ravishankar ......... H04W 48/16
(Continued)

FOREIGN PATENT DOCUMENTS

CN 108702244 10/2018
CN 110476462 11/2019
(Continued)

OTHER PUBLICATIONS

J. Lianghai, B. Han, M. Liu and H. D. Schotten, "Applying Device-to-Device Communication to Enhance IoT Services," in IEEE Communications Standards Magazine, vol. 1, No. 2, pp. 85-91, 2017, doi: 10.1109/MCOMSTD.2017.1700031. (Year: 2017).\*
(Continued)

*Primary Examiner* — William D Cumming
(74) *Attorney, Agent, or Firm* — Kowert, Hood, Munyon, Rankin & Goetzel, P.C.

(57) ABSTRACT

Sidelink pathloss between a remote user equipment device (UE) and a relay UE may be determined based at least on transmit power information provided by the relay UE to the remote UE. The remote UE may receive, via a sidelink discovery signal from the relay UE, a message that includes first information representative of a transmit power of the relay UE and/or second information representative of a measured receive signal power of a sidelink solicitation signal previously transmitted by the remote UE and received by the relay UE. The remote UE may determine a sidelink pathloss between the remote UE and the relay UE based at least on the first information and/or the second information. The remote UE may select/reselect a relay UE based on corresponding pathlosses determined for the respective paths between the remote UE and different respective relay UEs.

20 Claims, 8 Drawing Sheets

(51) Int. Cl.
*H04W 52/38* (2009.01)
*H04W 88/04* (2009.01)
*H04W 92/18* (2009.01)

(56) References Cited

U.S. PATENT DOCUMENTS

| | | | | |
|---|---|---|---|---|
| 11,811,432 | B2* | 11/2023 | Edge | H04B 7/18513 |
| 11,956,065 | B2* | 4/2024 | Xu | H04W 60/00 |
| 2019/0356400 | A1* | 11/2019 | Muraoka | H04B 17/318 |
| 2020/0229105 | A1* | 7/2020 | Cai | H04W 52/242 |
| 2020/0351833 | A1 | 11/2020 | Chae | |
| 2021/0105065 | A1* | 4/2021 | Ravishankar | H04W 68/005 |
| 2022/0060250 | A1* | 2/2022 | Xu | H04W 60/00 |
| 2022/0322194 | A1* | 10/2022 | Wu | H04W 52/242 |
| 2023/0079636 | A1* | 3/2023 | Edge | H04W 60/04 370/316 |
| 2024/0031972 | A1* | 1/2024 | Kuang | H04W 60/04 |
| 2024/0098699 | A1* | 3/2024 | Qu | H04B 7/18539 |

FOREIGN PATENT DOCUMENTS

| | | | |
|---|---|---|---|
| EP | 3644660 | 4/2020 | |
| EP | 3855811 | 7/2021 | |
| EP | 4068657 A1 * | 10/2022 | H04B 17/382 |
| WO | 2020067682 | 4/2020 | |

OTHER PUBLICATIONS

Extended European Search Report for EP Patent Application No. 22164528.6; 12 pages; Sep. 2, 2022.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)",3GPP Standard; Technical Specification; 3GPP TS 36.300, 3rd Generation Partnership Project (3GPP), Mobile Competence Centre ; 650, Route Des Lucioles : F-06921 Sophia-Antipolis Cedex ; France. vol. RAN WG2, No. V16.5.0; pp. 1-391; Mar. 29, 2021.

* cited by examiner

```
SL-PowerControl-r16 ::=        SEQUENCE {
    s1-MaxTransPower-r16           INTEGER (-30 .. 33),
    s1-Alpha-PSSCH-PSCCH-r16       ENUMERATED {alpha0, alpha04, alpha05, alpha06, alpha07, alpha08, alpha09, alpha1}    OPTIONAL, -- Need M
    d1-Alpha-PSSCH-PSCCH-r16       ENUMERATED {alpha0, alpha04, alpha05, alpha06, alpha07, alpha08, alpha09, alpha1}    OPTIONAL, -- Need S
    s1-P0-PSSCH-PSCCH-r16          INTEGER (-16 .. 15)                                                                  OPTIONAL, -- Need S
    d1- P0-PSSCH-PSCCH-r16         INTEGER (-16 .. 15)                                                                  OPTIONAL, -- Need M
    d1-Alpha-PSFCH- r16            ENUMERATED {alpha0, alpha04, alpha05, alpha06, alpha07, alpha08, alpha09, alpha1}    OPTIONAL, -- Need S
    d1- P0 -PSFCH-r16              INTEGER (-16 .. 15)                                                                  OPTIONAL, -- Need M
    ...
}
```

FIG. 6

| Circumstances | Power control for SL broadcast | Power control for SL unicast |
|---|---|---|
| Remote UE using U2N relay | None, DL-pathloss | None, SL-pathloss or DL-/SL-pathloss |
| Remote UE using OOC U2U relay | None | None, SL-pathloss |
| Remote UE using IC U2U relay | None, DL-pathloss | None, SL-pathloss or DL-/SL-pathloss |

FIG. 7

| Circumstances | Scenarios | Problems |
|---|---|---|
| No power control is configured for any relay | None vs. None | Relay UEs may transmit with different maximum transmit (TX) power |
| No relay has PC5 link. At least one relay UE is configured with OLPC. | None vs. DL-pathloss OLPC | TX power changes on occasion |
| | Dl-pathloss vs. DL-pathloss | Relay UE's DL-pathloss calculation is unknown to remote UE |
| Reselection: current relay is configured with SL-based OLPC. | DL-pathloss vs. SL-pathloss | Remote UE's SL-RSRP measurement depends on TX power used by relay UE which is subject to DL or SL OLPC |
| | DL-pathloss vs. DL-/SL-pathloss | |
| | None vs. SL-pathloss | |
| | None vs. DL-/SL-pathloss | |

FIG. 8

SIDELINK RELAY SELECTION AND RE-SELECTION IN WIRELESS COMMUNICATION

PRIORITY INFORMATION

This application claims priority to U.S. provisional patent application Ser. No. 63/169,113, entitled "Sidelink Relay Selection and Re-Selection in Wireless Communication," filed Mar. 31, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless communications, including dynamic adaptation of reference signal transmission in wireless communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. A current telecommunications standard moving beyond the current International Mobile Telecommunications-Advanced (IMT-Advanced) Standards is called 5th generation mobile networks or 5th generation wireless systems, referred to as 3GPP NR (otherwise known as 5G-NR or NR-5G for 5G New Radio, also simply referred to as NR). NR proposes a higher capacity for a higher density of mobile broadband users, also supporting device-to-device, ultra-reliable, and massive machine communications, as well as lower latency and lower battery consumption, than LTE standards.

One aspect of wireless communication systems, including NR cellular wireless communications, involves device-to-device communications with devices at times operating as relays for aiding such communications. Improvements in the field are desired.

SUMMARY OF THE INVENTION

Embodiments are presented herein of, inter alia, of methods and procedures for various devices, e.g. wireless communication devices, to select and/or reselect relay devices during wireless communications, for example during device-to-device or sidelink communications. Embodiments are further presented herein for wireless communication systems containing wireless communication devices or user equipment devices (UEs) and/or base stations and access points (APs) communicating with each other within the wireless communication systems.

In order to more accurately determine sidelink pathloss between a remote UE and a relay UE, a remote UE may receive, via a sidelink discovery signal from the relay UE, a message including first information representative of a transmit power of the relay UE and/or second information representative of a first measured receive signal power of a sidelink solicitation signal received from the remote UE by the relay UE. The remote UE may determine a sidelink pathloss between the remote UE and the relay UE based at least on the first information and/or the second information. According to some embodiments, the remote UE may determine the sidelink pathloss for the direction of remote UE to relay UE transmissions, based on the second information and a measured transmit power of the sidelink solicitation signal. Similarly, the remote UE may measure a second receive signal power of the sidelink discovery signal, and determine the sidelink pathloss for the direction of relay UE to remote UE transmissions, based on the first information and the measured second receive signal power.

The second receive signal power may be measured based on the same demodulation reference signal symbols in the physical sidelink shared channel (PSSCH) for sidelink reference signal receive power (SRSP). The remote UE may receive the sidelink discovery signal in response to the sidelink solicitation signal. In some cases, the message may further include additional information indicating whether the transmit power of the relay UE is statically or dynamically configured. The remote UE may subsequently receive additional messages via corresponding sidelink discovery signals from the relay UE, with information representative of the transmit power of the relay UE included in select ones but not all of the additional messages when the transmit power of the relay UE is statically configured. Furthermore, in response to the third information indicating that the transmit power of the relay UE is statically configured, the remote UE may use the first information to determine the sidelink pathloss until one of the additional messages includes updated information representative of the transmit power of the relay UE, in which case the remote UE may begin using the updated information (representative of the transmit power of the relay UE) to determine the sidelink pathloss. The selection of messages to include (updated) information representative of the transmit power of the relay UE may be determined based on the elapsed time since information representative of the transmit power of the relay UE was last received by the remote UE. Alternatively, the selection may be determined based on how many additional messages were received by the remote UE subsequent to receiving the most recent information representative of the transmit power of the relay UE.

In some embodiments the message may further include power class information corresponding to the relay UE, information indicating whether the relay UE is subject to a power limit, and/or information representative of a link quality between the relay UE and a cellular base station.

In some embodiments, a remote UE may receive a sidelink reference signal receive power (RSRP) measurement in a sidelink measurement report from a relay UE when there is ongoing sidelink unicast traffic from the remote UE to the relay UE, and may determine the sidelink pathloss between the remote UE and the relay UE based at least in part on the received sidelink RSRP measurement. The sidelink measurement report may be transmitted to the remote UE by the relay UE in response to a previous request for the report by the remote UE via sidelink control information transmitted to the relay UE by the remote UE.

In some embodiments, a remote UE may transmit a sidelink signaling message to a relay UE, with the sidelink signaling message including a request for the relay UE to provide information about transmit power of the relay UE to the remote UE. The remote UE may receive the information from the relay UE in response to the request, and may determine the sidelink pathloss between the remote UE and the relay UE based at least in part on the information. The sidelink signaling message may be one of, but not limited to, a sidelink radio resource control (RRC) message, a media access control—control element (MAC CE), or a sidelink solicitation signal. The remote UE may transmit the sidelink signaling message at least partially in response to a lack of ongoing communications from the remote UE to the relay UE. In addition, the remote UE may receive the information from the relay UE via a sidelink RRC message, a MAC CE, or a sidelink discovery signal.

Pursuant to the above, a relay UE may transmit, via a sidelink discovery signal, to a remote UE, a message that includes first information representative of a transmit power of the relay UE and/or second information representative of a first measured receive signal power of a sidelink solicitation signal received from the remote UE. The first information and/or the second information enable the remote UE to determine a sidelink pathloss between the relay UE and the remote UE. The relay UE may transmit the sidelink discovery signal in response to receiving the sidelink solicitation signal from the remote UE. The message may also include third information indicating whether the transmit power of the relay UE is statically or dynamically configured. In case the transmit power of the relay UE is statically configured, when the relay UE transmits additional messages via corresponding sidelink discovery signals to the remote UE, information representative of the transmit power of the relay UE is included in select ones of the additional messages, not all of the additional transmitted messages. The messages that will include the relay UE transmit power information may be selected/determined based on an elapsed time since information representative of the transmit power of the relay UE was last transmitted by the relay UE the remote UE. Alternatively, the selection may be based on the number of additional messages transmitted by the relay UE subsequent to the relay UE last transmitting information representative of the transmit power of the relay UE. In other words, the relay UE transmit power information may be transmitted in every Nth transmitted additional message, where N is a nonzero integer. In some embodiments the message may further include power class information corresponding to the relay UE, information indicating whether the relay UE is subject to a power limit, and/or information representative of a link quality between the relay UE and a cellular base station.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 6 shows an exemplary code sequence for radio resource control (RRC) configuration for sidelink power control;

FIG. 7 shows a table illustrating different relay selection/reselection circumstances and the corresponding power control for sidelink broadcast and sidelink unicast, respectively;

FIG. 8 shows a table illustrating different relay selection/reselection circumstances, possible corresponding power control scenarios, and associated problems;

Figure 1:
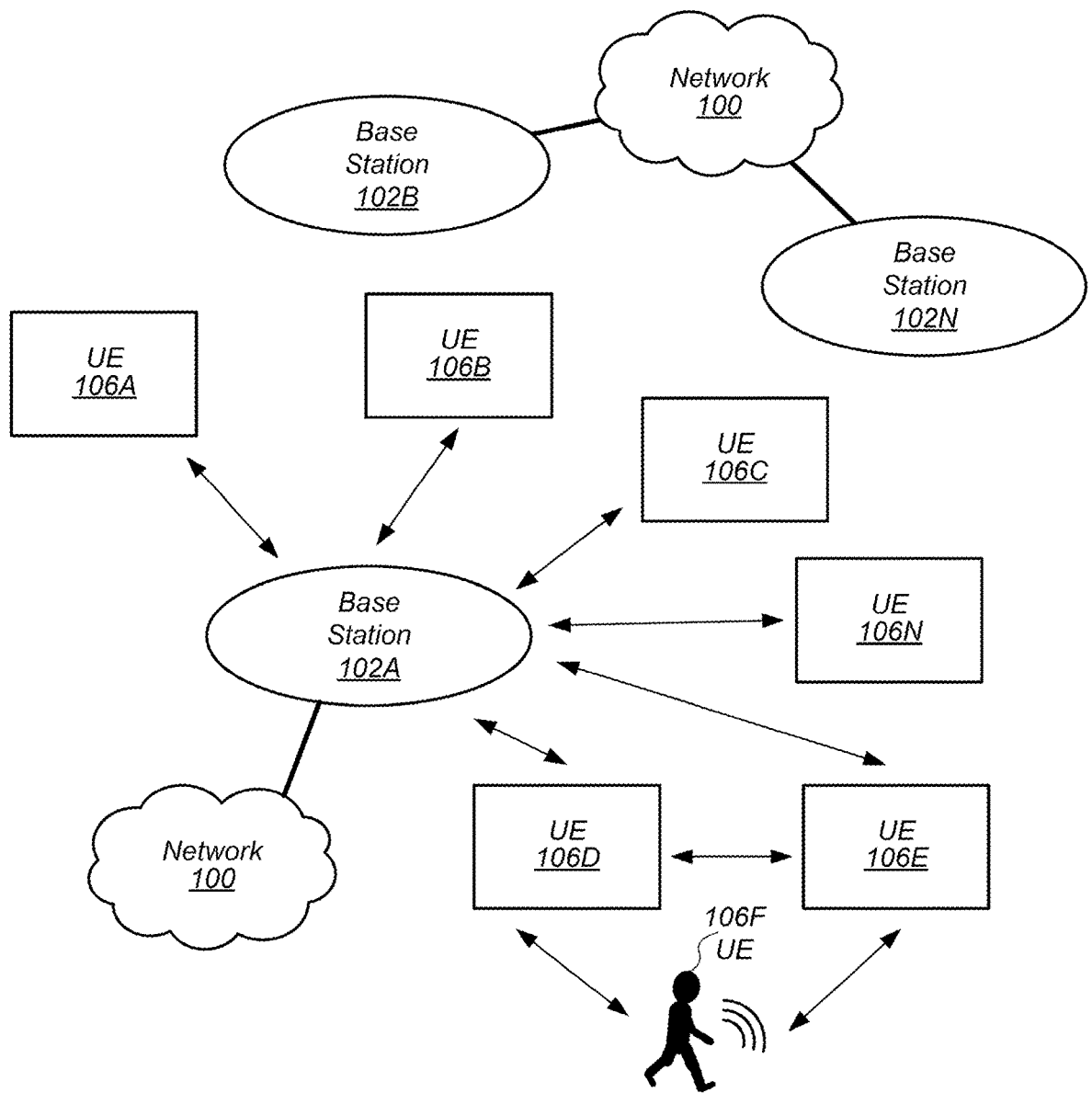
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AF: Application Function
AMF: Access and Mobility Management Function
AMR: Adaptive Multi-Rate
AP: Access Point
APN: Access Point Name
APR: Applications Processor
BS: Base Station
BSSID: Basic Service Set Identifier
CBRS: Citizens Broadband Radio Service
CBSD: Citizens Broadband Radio Service Device CCA: Clear Channel Assessment
CMR: Change Mode Request
CS: Circuit Switched
DL: Downlink (from BS to UE)
DMRS: Demodulation Reference Signal
DN: Data Network
DSDS: Dual SIM Dual Standby
DYN: Dynamic
EDCF: Enhanced Distributed Coordination Function
eSNPN: Equivalent Standalone Non-Public Network
FDD: Frequency Division Duplexing
FT: Frame Type
GAA: General Authorized Access
GPRS: General Packet Radio Service
GSM: Global System for Mobile Communication
GTP: GPRS Tunneling Protocol
HPLMN: Home Public Land Mobile Network
IC: In Coverage
IMS: Internet Protocol Multimedia Subsystem
IOT: Internet of Things
IP: Internet Protocol
LAN: Local Area Network
LBT: Listen Before Talk
LQM: Link Quality Metric
LTE: Long Term Evolution
MCC: Mobile Country Code
MNO: Mobile Network Operator
NAS: Non-Access Stratum
NF: Network Function
NG-RAN: Next Generation Radio Access Network
NID: Network Identifier
NMF: Network Identifier Management Function
NPN: Non-Public (cellular) Network
NRF: Network Repository Function
NSI: Network Slice Instance
NSSAI: Network Slice Selection Assistance Information
OOC: Out Of Coverage
PAL: Priority Access Licensee
PDCP: Packet Data Convergence Protocol
PDN: Packet Data Network
PDU: Protocol Data Unit
PGW: PDN Gateway
PLMN: Public Land Mobile Network
PSCCH: Physical Sidelink Control Channel
PSFCH: Physical Sidelink Feedback Channel
PSSCH: Physical Sidelink Shared Channel
PSD: Power Spectral Density
PSS: Primary Synchronization Signal
PT: Payload Type
PTRS: Phase Tracking Reference Signal
QBSS: Quality of Service Enhanced Basic Service Set
QI: Quality Indicator
RA: Registration Accept
RAT: Radio Access Technology
RF: Radio Frequency
ROHC: Robust Header Compression
RR: Registration Request
RRC: Radio Resource Control
RSRP: Reference Signal Receive Power
RTP: Real-time Transport Protocol
RX: Reception/Receive
SAS: Spectrum Allocation Server
SD: Slice Descriptor
SI: System Information
SIB: System Information Block
SID: System Identification Number
SIM: Subscriber Identity Module
SGW: Serving Gateway
SMF: Session Management Function
SNPN: Standalone Non-Public Network
SSS: Secondary Synchronization Signal
SUPI: Subscription Permanent Identifier
TBS: Transport Block Size
TCP: Transmission Control Protocol
TDD: Time Division Duplexing
TDRA: Time Domain Resource Allocation
TPC: Transmit Power Control
TX: Transmission/Transmit
UAC: Unified Access Control
UDM: Unified Data Management
UDR: User Data Repository
UE: User Equipment
UI: User Input
UL: Uplink (from UE to BS)
UMTS: Universal Mobile Telecommunication System
UPF: User Plane Function
URM: Universal Resources Management
URSP: UE Route Selection Policy
USIM: User Subscriber Identity Module
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™ Microsoft XBox™, etc.), portable gaming devices (e.g., Nintendo DS™, PlayStation Portable™, Gameboy Advance™, iPod™), laptops, wearable devices (e.g. smart watch, smart glasses), PDAs, portable Internet devices, music players, data storage devices, or other handheld devices, unmanned aerial vehicles (e.g., drones) and unmanned aerial controllers, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. 5G NR, LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Transmission Scheduling—Refers to the scheduling of transmissions, such as wireless transmissions. In some implementations of cellular radio communications, signal and data transmissions may be organized according to designated time units of specific duration during which transmissions take place. As used herein, the term "slot" has the full extent of its ordinary meaning, and at least refers to a smallest (or minimum) scheduling time unit in wireless communications. For example, in 3GPP LTE, transmissions are divided into radio frames, each radio frame being of equal (time) duration (e.g. 10 ms). A radio frame in 3GPP LTE may be further divided into a specified number of (e.g. ten) subframes, each subframe being of equal time duration, with the subframes designated as the smallest (minimum) scheduling unit, or the designated time unit for a transmission. Thus, in a 3GPP LTE example, a "subframe" may be considered an example of a "slot" as defined above. Similarly, a smallest (or minimum) scheduling time unit for 5G NR (or NR, for short) transmissions is referred to as a "slot". In different communication protocols the smallest (or minimum) scheduling time unit may also be named differently.

Resources—The term "resource" has the full extent of its ordinary meaning and may refer to frequency resources and time resources used during wireless communications. As used herein, a resource element (RE) refers to a specific amount or quantity of a resource. For example, in the context of a time resource, a resource element may be a time period of specific length. In the context of a frequency resource, a resource element may be a specific frequency bandwidth, or a specific amount of frequency bandwidth, which may be centered on a specific frequency. As one specific example, a resource element may refer to a resource unit of 1 symbol (in reference to a time resource, e.g. a time period of specific length) per 1 subcarrier (in reference to a frequency resource, e.g. a specific frequency bandwidth, which may be centered on a specific frequency). A resource element group (REG) has the full extent of its ordinary meaning and at least refers to a specified number of consecutive resource elements. In some implementations, a resource element group may not include resource elements reserved for reference signals. A control channel element (CCE) refers to a group of a specified number of consecutive REGs. A resource block (RB) refers to a specified number of resource elements made up of a specified number of subcarriers per specified number of symbols. Each RB may include a specified number of subcarriers. A resource block group (RBG) refers to a unit including multiple RBs. The number of RBs within one RBG may differ depending on the system bandwidth.

Bandwidth Part (BWP)—A carrier bandwidth part (BWP) is a contiguous set of physical resource blocks selected from a contiguous subset of the common resource blocks for a given numerology on a given carrier. For downlink, a UE may be configured with up to a specified number of carrier BWPs (e.g. four BWPs, per some specifications), with one BWP per carrier active at a given time (per some specifications). For uplink, the UE may similarly be configured with up to several (e.g. four) carrier BWPs, with one BWP per carrier active at a given time (per some specifications). If a UE is configured with a supplementary uplink, then the UE may be additionally configured with up to the specified number (e.g. four) carrier BWPs in the supplementary uplink, with one carrier BWP active at a given time (per some specifications).

Multi-cell Arrangements—A Master node is defined as a node (radio access node) that provides control plane connection to the core network in case of multi radio dual connectivity (MR-DC). A master node may be a master eNB (3GPP LTE) or a master gNB (3GPP NR), for example. A secondary node is defined as a radio access node with no control plane connection to the core network, providing additional resources to the UE in case of MR-DC. A Master Cell group (MCG) is defined as a group of serving cells associated with the Master Node, including the primary cell (PCell) and optionally one or more secondary cells (SCell). A Secondary Cell group (SCG) is defined as a group of serving cells associated with the Secondary Node, including a special cell, namely a primary cell of the SCG (PSCell), and optionally including one or more SCells. A UE may typically apply radio link monitoring to the PCell. If the UE is configured with an SCG then the UE may also apply radio link monitoring to the PSCell. Radio link monitoring is generally applied to the active BWPs and the UE is not required to monitor inactive BWPs. The PCell is used to initiate initial access, and the UE may communicate with the PCell and the SCell via Carrier Aggregation (CA). Currently Amended capability means a UE may receive and/or transmit to and/or from multiple cells. The UE initially connects to the PCell, and one or more SCells may be configured for the UE once the UE is in a connected state.

Core Network (CN)—Core network is defined as a part of a 3GPP system which is independent of the connection technology (e.g. the Radio Access Technology, RAT) of the UEs. The UEs may connect to the core network via a radio access network, RAN, which may be RAT-specific.

Camping on a Cell/Network—Camping on a cell or being camped on a cell generally refers to the process of a UE having completed a cell selection/reselection process and having chosen a cell. While camped on a cell, the UE may monitor system information and (in most cases) paging information. For example, a UE may search for a suitable cell of a chosen network (for example public land mobile network, PLMN) and may select that cell to provide available services to the UE, and may tune to the selected cell's control channel. This selection and subsequent monitoring on that cell is referred to as "camping on the cell". As part of camping on a cell a UE may also register its presence in the registration area of the chosen cell, if necessary, by means of a location registration procedure. If the UE finds a more suitable cell, it may reselect onto that alternative cell of the selected network and camp on that cell. If the new cell is in a different registration area, location registration with the cell may also be performed by the UE.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
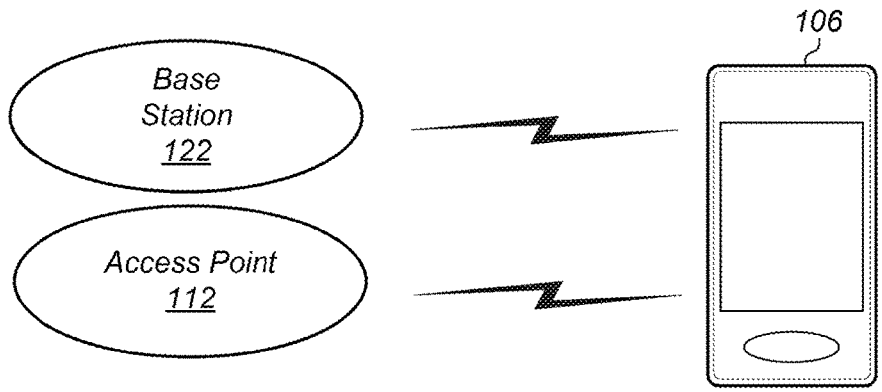
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106. Various ones of the UEs 106 may select and/or reselect relay devices during wireless communications, for example during device-to-device or sidelink communications, according to various embodiments disclosed herein.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, neutral host or various CBRS (Citizens Broadband Radio Service) deployments, among various possibilities). Thus, the base station 102A may facilitate communication between the user devices 106 and/or between the user devices 106 and the network 100. In particular, the cellular base station 102A may provide UEs 106 with various telecommunication capabilities, such as voice, short message service (SMS) and/or data services. The communication area (or coverage area) of the base station 106 may be referred to as a "cell." It is noted that "cell" may also refer to a logical identity for a given wireless communication coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network and/or cell insofar as uplink and downlink communications of the UE with the network/cell are conducted via the base station. Thus, a UE communicating with one or more base stations in the network may also be interpreted as the UE communicating with the network, and may further also be considered at least a part of the UE communicating on the network or over the network.

The base station(s) 102 and the user devices 106 may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if the base station 102A is implemented in the context of LTE, it may alternately be referred to as an 'eNodeB' or 'eNB'. Similarly, if the base station 102A is implemented in the context of 5G NR, it may alternately be referred to as 'gNodeB' or 'gNB'. In some embodiments, the base station 102 (e.g. an eNB in an LTE network or a gNB in an NR network) may communicate with at least one UE having the capability to transmit reference signals according to various embodiments disclosed herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to private networks. Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices 106 and/or between the user devices 106 and the network 100. In particular, the cellular base station 102A may provide UEs 106 with various telecommunication capabilities, such as voice, SMS and/or data services. UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102A and other similar base stations (such as base stations 102B . . . 102N) operating according to the same or a different cellular communication standard may thus be provided as one or more networks of cells, which may provide continuous or nearly continuous overlapping service to UE 106 and similar devices over a wide geographic area via one or more cellular communication standards.

Thus, while base station 102A may act as a "serving cell" for UEs 106A-106N as illustrated in FIG. 1, each one of UE(s) 106 may also be capable of receiving signals from (and may possibly be within communication range of) one or more other cells (possibly provided by base stations 102B-102N and/or any other base stations), which may be referred to as "neighboring cells". Such cells may also be capable of facilitating communication in-between user devices 106 and/or between user devices 106 and the network 100. Such cells may include "macro" cells, "micro" cells, "pico" cells, and/or cells which provide any of various other granularities of service area size. For example, base stations 102A-102B illustrated in FIG. 1 may be macro cells, while base station 102N may be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE(s) 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

As also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting in a similar manner with the vehicles represented by UEs 106D and 106E. Various embodiments of vehicles communicating in a network exemplified in FIG. 1 are disclosed, for example, in the context of vehicle-to-everything (V2X) communications such as the communications specified by certain versions of the 3GPP standard, among others.

FIG. 2 illustrates an exemplary user equipment 106 (e.g., one of UEs 106A through 106N) in communication with the base station 122 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include radio circuitries for communicating using either of LTE or CDMA2000 1xRTT or NR, and separate radios for communicating using each of Wi-Fi and BLUETOOTH™. Other configurations are also possible.

Figure 3:
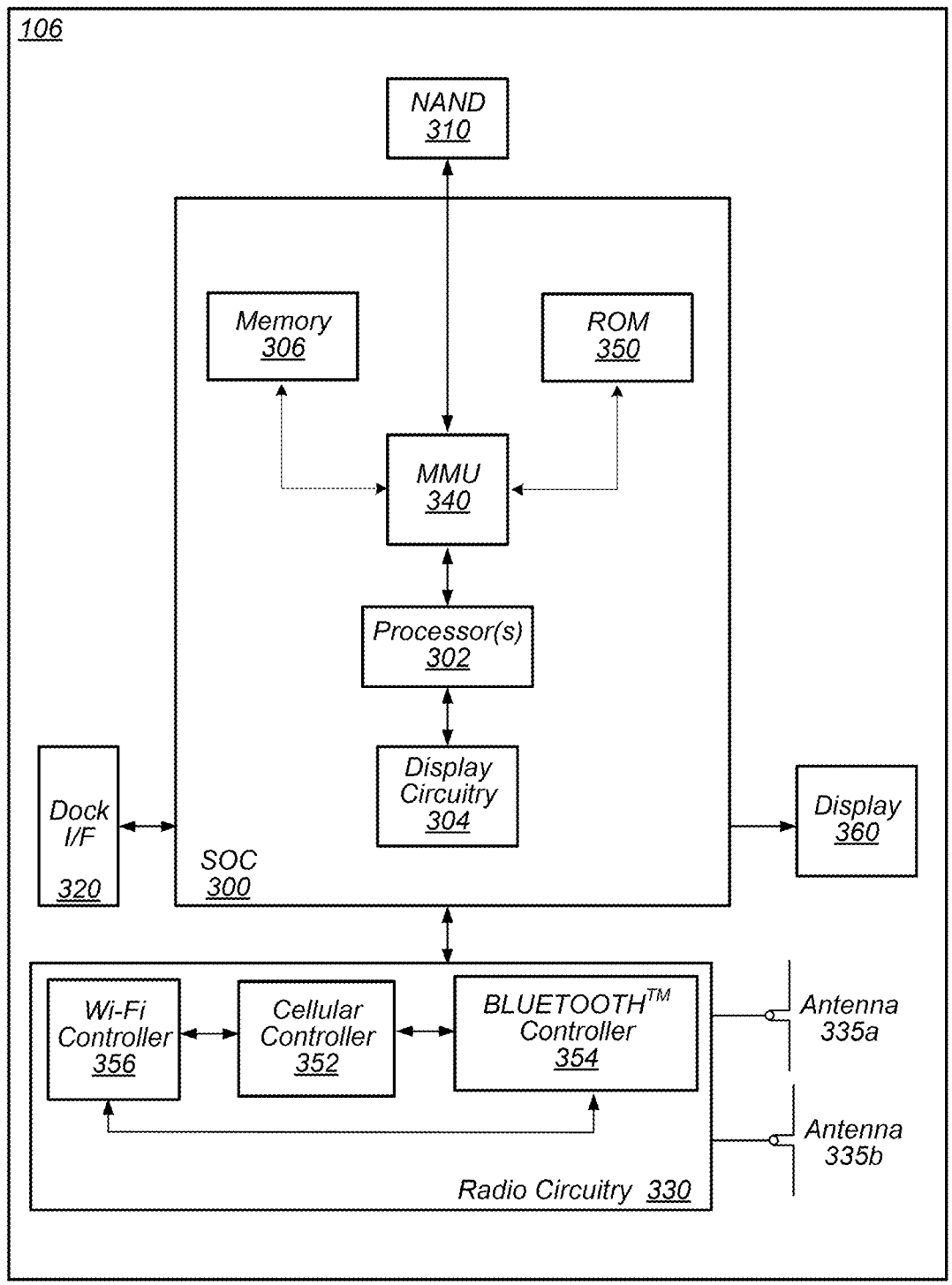
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include various elements/components for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to select and/or reselect relay devices during wireless communications, for example during device-to-device or sidelink communications, according to various embodiments disclosed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 according to various embodiments disclosed herein. Specifically, processor(s) 302 may be coupled to and/or may interoperate with other components as shown in FIG. 3 to facilitate UE 106 selecting and/or reselecting relay devices during wireless communications, for example during device-to-device or sidelink communications. Processor(s) 302 may also implement various other applications and/or end-user applications running on UE 106.

Figure 5:
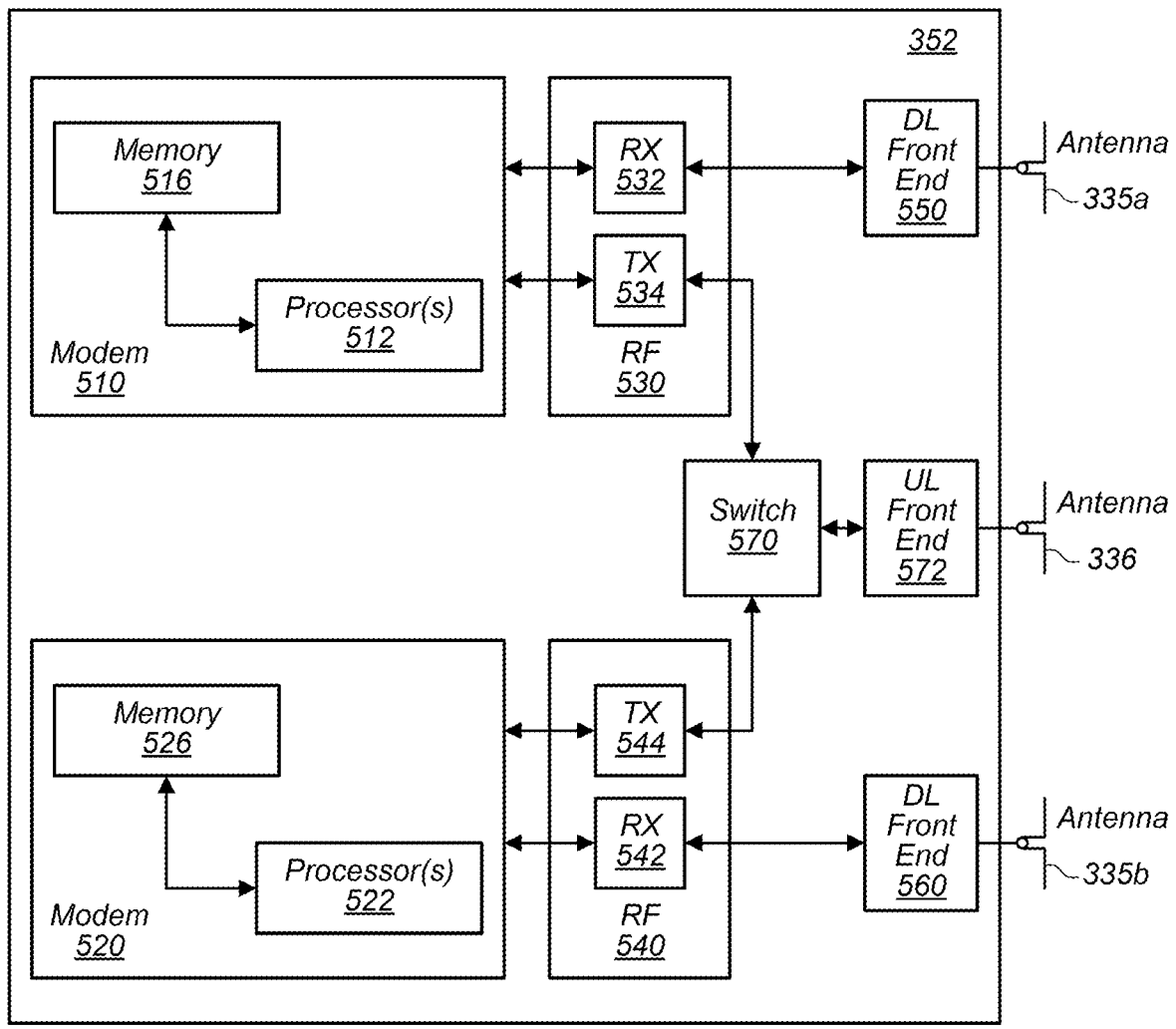
FIG. 5 shows an exemplary simplified block diagram illustrative of cellular communication circuitry, according to some embodiments.

In some embodiments, radio circuitry 330 may include separate controllers dedicated to controlling communications for various respective RATs and/or RAT standards. For example, as shown in FIG. 3, radio circuitry 330 may include a Wi-Fi controller 356, a cellular controller (e.g. LTE and/or NR controller) 352, and BLUETOOTH™ controller 354, and according to at least some embodiments, one or more or all of these controllers may be implemented as respective integrated circuits (ICs or chips, for short) in communication with each other and with SOC 300 (e.g. with processor(s) 302). For example, Wi-Fi controller 356 may communicate with cellular controller 352 over a cell-ISM link or WCI interface, and/or BLUETOOTH controller 354 may communicate with cellular controller 352 over a cell-ISM link, etc. While three separate controllers are illustrated within radio circuitry 330, other embodiments may have fewer or more similar controllers for various different RATs and/or RAT standards that may be implemented in UE device 106. For example, at least one exemplary block diagram illustrative of some embodiments of cellular controller 352 is shown in FIG. 5 and will be further described below.

Figure 4:
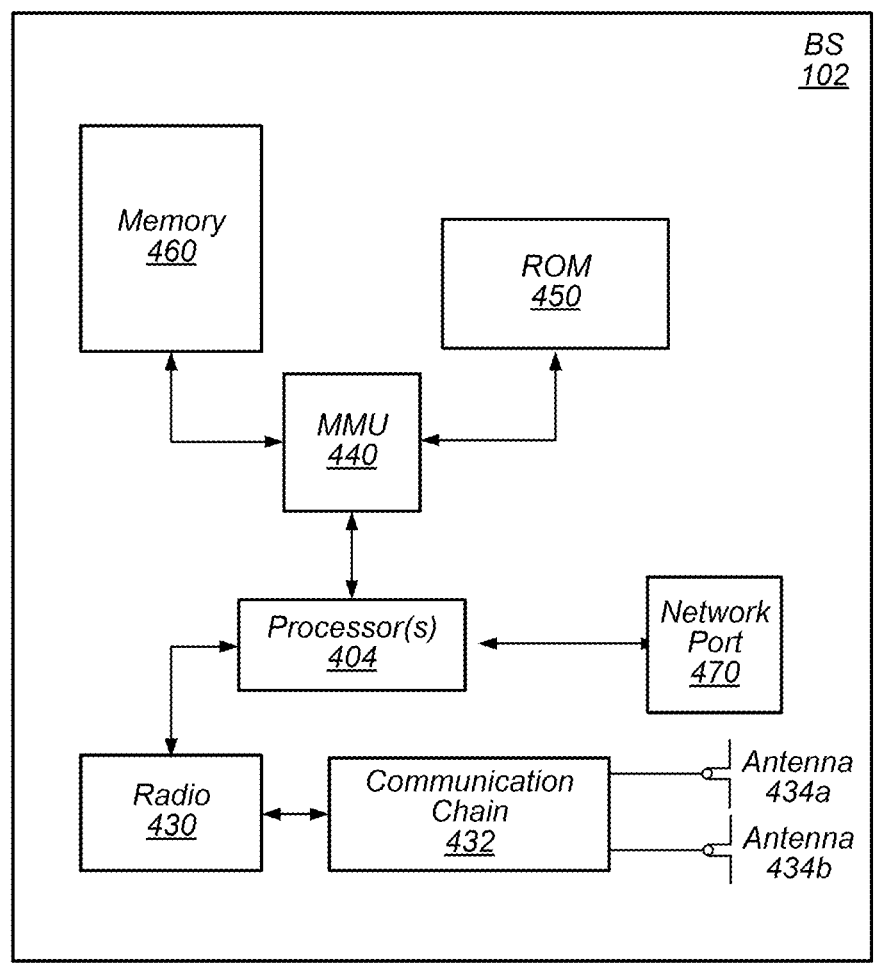
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434a, and possibly multiple antennas (e.g. illustrated by antennas 434a and 434b), for performing wireless communication with mobile devices and/or other devices. Antennas 434a and 434b are shown by way of example, and base station 102 may include fewer or more antennas. Overall, the one or more antennas, which may include antenna 434a and/or antenna 434b, are collectively referred to as antenna 434 or antenna(s) 434. Antenna(s) 434 may be configured to operate as a wireless transceiver and may be further configured to communicate with UE devices 106 via radio circuitry 430. The antenna(s) 434 communicates with the radio 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (NR) WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device as disclosed herein. Alternatively, the processor(s) 404 may be configured as a programmable hardware element(s), such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices according to various embodiments disclosed herein.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335*a-b* and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more components. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335*b*. As another example, the cellular communication circuitry 352 may not include the modem 510, the RF front end 530, the DL front end 550, and/or the antenna 335*a*. In some embodiments, the cellular communication circuitry 352 may also not include the switch 570, and the RF front end 530 or the RF front end 540 may be in communication, e.g., directly, with the UL front end 572.

Device-to-Device Communications

Device-to-device (D2D) communication refers to user equipment devices (UEs) directly communicate with each other without transferring data through a base station (BS) or other higher-level network infrastructure. D2D communication plays a crucial role in enhancing the coverage and transmission capacity of cellular and D2D communications. One example of D2D communications was provided above with respect to FIG. 1, in which UEs 106D and 106E may represent vehicles communicating directly with each other. Various embodiments of vehicles communicating with each other as exemplified in FIG. 1 may be in the context of vehicle-to-everything (V2X) communications which cover D2D communications, such as the communications specified by certain versions of the 3GPP standard. D2D-enabled cellular networks may make provisions for D2D users to share spectrum resources in two different ways. In-band D2D communications may take place over the licensed spectrum while out-band D2D communication may take place over the unlicensed spectrum. In-band D2D may be further divided into two categories, an underlay category in which D2D users share the same frequency resources used by cellular users, and an overlay category in which both network-bases and D2D communications use orthogonal spectrum resources. With the rising number of cellular users it has become challenging to accommodate all users within the limited available spectrum and to provision wide bandwidths for high data rate applications such as online gaming, video sharing etc. One way of improving the energy efficiency of wireless networks includes the use of relay nodes or relay UEs. Instead of one long hop from one node to another, various UEs may be operated as strategically deployed/positioned relays to turn a single long hop into two or more shorter hops. Although the operation of relays is greatly affected by pathloss models and environmental conditions, it has proven effective in reducing pathloss and improving D2D communications.

Sidelink Communications and Relay Selection/Reselection

In D2D communications, e.g. cellular wireless communications, sidelink communication (also referred to as communication over a PC5 link, where PC5 link refers to sidelink) represents the communication mechanism between devices that is not carried through a base station, e.g. it is not carried through eNB/gNB. In other words, the devices communicate with each other without the communication requiring facilitation by a base station. It is in this sense that the devices may be said to be communicating with each other directly. Accommodation of such communication between devices (or between UEs/PUEs) includes a new physical layer design featuring minimal design changes to existing implementations.

As previously mentioned, sidelink communications may be improved through select UEs operating as relay devices. Relay selection or reselection for communications that involve the use of relay devices (also simply referred to herein as relays) is similar to cell selection during network-based cellular communications. The UE may need to evaluate relay quality based on radio signal measurements. Current agreements for basic relay selection and reselection for both UE-to-Network relay and UE-to-UE relay include:

Radio measurements at PC5 interface are considered part of relay (re)selection criteria;

Remote UE is expected to use (at least) "Radio signal strength measurements of Sidelink Discovery Messages" to evaluate whether the PC5 link quality of a relay UE satisfies relay selection and reselection criteria; and Remote UE may also use sidelink Reference Signal Received Power (SL-RSRP) measurements on the Sidelink unicast link to evaluate whether PC5 link quality with a relay UE satisfies relay reselection criteria. Details, e.g. in case of no transmission on the unicast link, are subject of future discussions.

The power control mechanisms affect the received signal strength measurements. Specifically, SL unicast transmissions may use open-loop power control (OLPC) between the transmitting (TX) UE and the receiving (RX) UE. SL broadcast transmissions may use OLPC between UE and gNB (if UE is in coverage). One of the main issues is how to define what type of comparisons may be performed for relay evaluation. A fair comparison may be based on PL (pathloss) in PC5 radio propagation between a relay UE and a remote UE. A pathloss based comparison or determination reflects the attenuation and degradation of the radio signal transmitted/received over the SL channel. A pathloss metric may be obtained by the formula P_rx/P_tx, where P_rx refers to the receive power (e.g. RSRP) and P_tx refers to the transmit power. This metric is based on knowledge of both the transmit power and receive power. However, with or without power control, the transmit power of a relay UE side is usually not readily available at the remote UE side, which presents a problem in pathloss determination. In other words, the pathloss between a remote UE and a relay UE may be determined in two possible directions, and the pathloss in one direction may not be identical to the pathloss in the other direction if channel responses are not reciprocal.

Currently, NR sidelink OLPC may be set up via higher layer (e.g., RRC) configuration. One example of RRC configuration for sidelink power control is shown in FIG. 6 by way of an exemplary code segment. Table 700 in FIG. 7 provides different relay selection/reselection circumstances and the corresponding power control for sidelink broadcast and sidelink unicast, respectively. As indicated in table 700, whether a remote UE uses a UE-to-Network (U2N) relay, an out of coverage (OOC) UE-to-UE (U2U) relay, or an in coverage (IC) U2U relay, the relays may not use any power control method at all ("None"), or may use various different power control methods as listed (e.g. DL-pathloss, SL-pathloss, etc.) In order for a UE to select or reselect a relay UE, the UE may need to compare the relative PC5 link quality of two or more relay UE candidates. There are multiple different scenarios possible for such a comparison, as illustrated in the table shown in FIG. 8. Similar to what is illustrated in table 700, table 800 also indicates that in many cases no power control mechanism may be used by any of the relay UEs (first row of table 800), or a variety of different power control mechanisms may be used by the relays. The problems arising from each illustrated circumstance (or arrangement) are indicated in the third column of table 800.

Sidelink-based OLPC has also been defined for at least present-day V2X communications. For SL-RSRP measurements for SL OLPC, various sidelink channels (e.g. PSSCH, PSCCH) and DMRS may be used. However, PSFCH power control based on SL-pathloss is presently not supported. For unicast RX UEs, SL-RSRP is reported to the TX UE. TPC commands for SL power control are not supported. Layer 3 (L3)-filtered sidelink RSRP reporting (from RX UE to TX UE) for open-loop power control for PSCCH/PSSCH uses higher layer signaling (e.g. RRC messages). Pathloss may be derived and power control may be applied as follows:

The power control formula may be applied to each transmission; fixing the PSD of the PSSCH DMRS at the TX UE for a time duration is not supported; and For Reference Signal Power (RSP) in the SL pathloss calculation, the TX UE uses L3-filtered TX power with the coefficients configured for L3-RSRP measurement.

A TX UE may transmit a PSSCH in a slot. PSCCH, SL CSI-RS, SL PTRS, PSCCH-DMRS, and PSSCH-DMRS may all be transmitted with the same PSD during (or in) a slot. Equal power is used for each antenna port for 2-AP PSSCH transmissions. Simultaneous PSFCH transmissions in a PSFCH TX occasion are supported. If both DL- and SL-OLPC are configured, the UE may choose the minimum TX power from among the two calculated settings.

Improved Sidelink Relay Selection/Reselection

As indicated in table 700 of FIG. 7 and table 800 of FIG. 8, currently, when evaluating a (potential) link to the relay UE the (same) relay UE may or may not adopt a power control mechanism, and/or may adopt one or more different power control mechanisms, which creates uncertainty about how the sidelink receive power measurements are to be interpreted. It therefore becomes important for a relay UE to disclose additional information in order for pathloss to be estimated/determined. Instead of indicating which power control mechanism is used, a more straightforward approach may involve the relay UE disclosing information associated with or corresponding to the relay UE's (instant) TX power.

Figure 9:
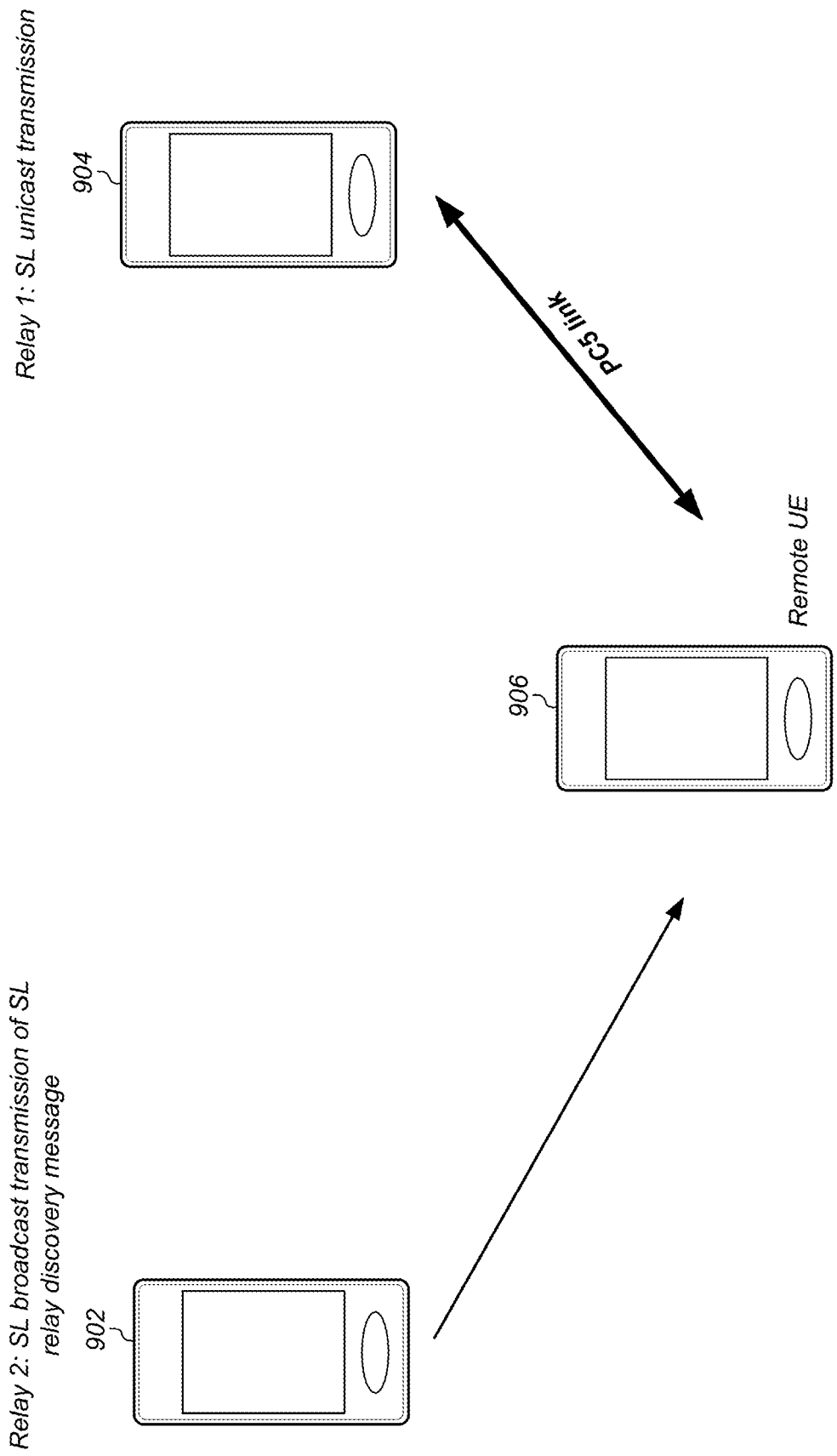
FIG. 9 shows an exemplary wireless system including a remote UE and multiple relay UEs, according to some embodiments.

Accordingly, relay selection may be performed according to a relay discovery-message based evaluation. FIG. 9 illustrates a wireless system in which a remote UE 906 may select/reselect one of two relay UEs 902 and 904, respectively. As shown in FIG. 9, a PC5 unicast link exists between relay UE 904 and remote UE 906. Relay UE 902 may broadcast a sidelink relay discovery message which may be received by remote UE 906. However, a PC5 unicast link may not exist between remote UE 906 and relay UE 902. Accordingly, remote UE 906 may receive sidelink unicast transmissions from relay UE 904 and it may receive sidelink broadcast transmissions from relay UE 902. In some embodiments, the signal strength of the broadcasted discovery message may be used as the basis of comparison. Accordingly, new measurements based on discovery message may be defined. The signal strength may be measured by either the remote UE or relay UE. When the signal strength is measured in the relay UE, the measurements may be conveyed to the remote UE for the purpose of possible relay selection/reselection. Consideration may be given to the fact that different TX power may be configured by different cells (e.g. via SIB or dedicated RRC). Further consideration may be given to OLPC-based on communication between a base station and the relay UE when the relay UE is in-coverage (of the base station).

Figure 10:
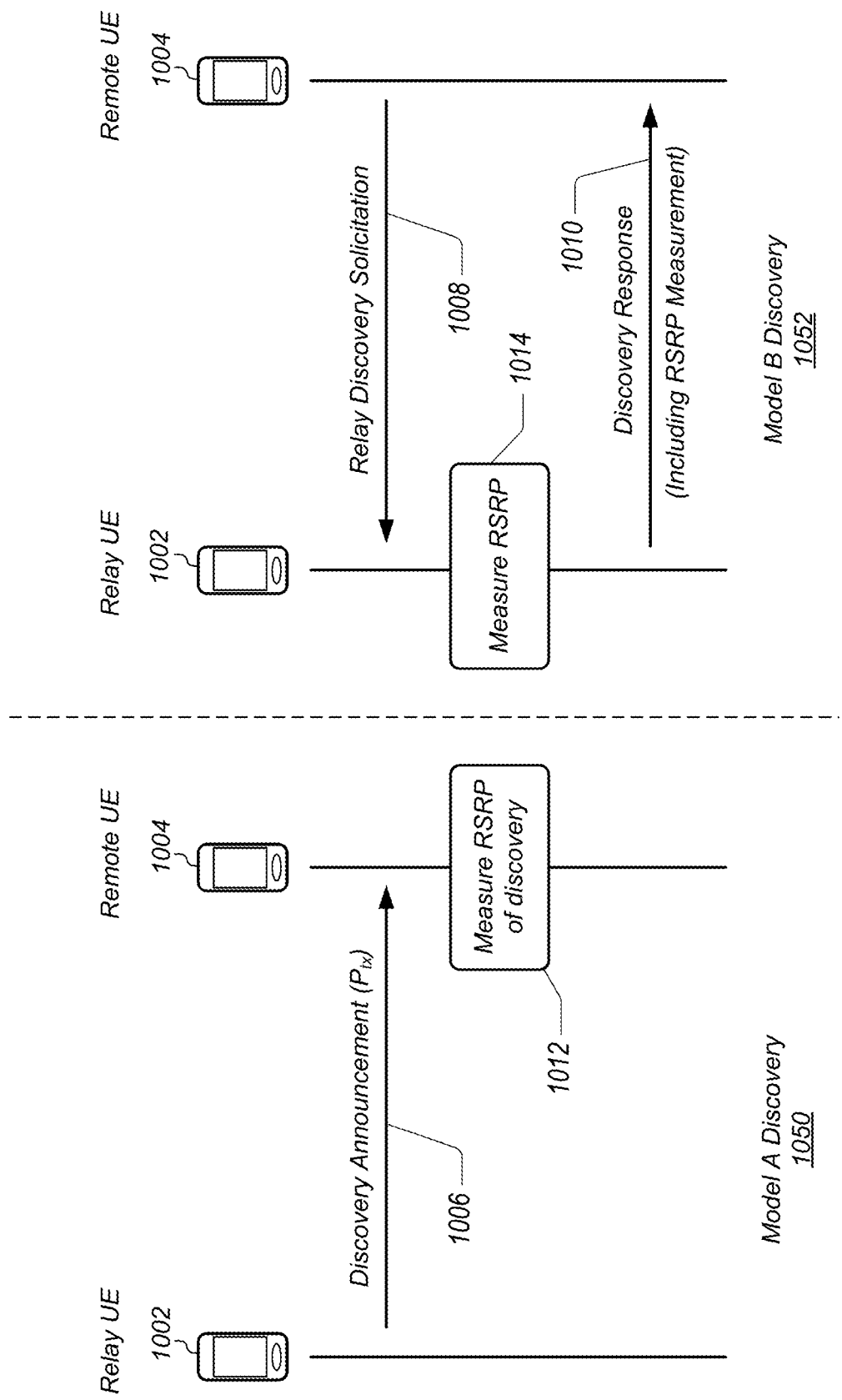
FIG. 10 shows respective timing diagrams for two different examples of sidelink discovery measurements for determining pathloss between a remote UE and a relay UE, according to some embodiments.

Pursuant to the above, the pathloss may be determined based on PC5 discovery measurements. The PC5 pathloss may be calibrated or determined based on one of two different receive signals. According to some embodiments, the receive signal may be a "discovery message" signal received at the remote UE 906, while according to some embodiments the receive signal may be a "relay discovery solicitation" signal received at the relay UEs 902/904. The two different calibration/determination opportunities are illustrated in FIG. 10 by the simplified timing diagrams 1050 and 1052, respectively.

As illustrated in the first timing diagram 1050 labeled "Model A Discovery", a discovery announcement message representative of (or indicating) transmit power of the relay UE 1002 is transmitted (1006). The remote UE 1004 receives the discovery announcement message and may measure the receive signal power (e.g. RSRP) based on the received discovery announcement message (1012). According to the Model A Discovery 1050, the relay UE 1002 may include information indicative of its transmit power (TX power) when broadcasting the SL relay discovery message, and the remote UE 1004 may use the thus received TX power information and measured signal power to determine/estimate the pathloss (associated with relay UE to remote UE transmissions). The relay UE 1002 may also include information indicative of a status of its TX power, for example whether the TX power is static or dynamic, and may skip the inclusion of TX power information in some discovery announcement messages if the TX power of relay UE 1002 is statically configured. For example, the relay UE 1002 may include the TX power information once every specified number (N) of transmissions of the discovery announcement message, or once every specified time period (e.g. the information may be included each time a specified time duration has elapsed since the most recent transmission of the TX power information). In such cases the remote UE 1004 may use the most current available TX power information for the relay UE 1002 in determining the current pathloss until remote UE 1004 receives TX power information in a new discovery announcement message from relay UE 1002.

As illustrated in the second timing diagram 1052 labeled "Model B Discovery", a relay discovery solicitation message may be transmitted by remote UE 1004 (1008). This message may be received by the relay UE 1002, which may measure the receive signal power (e.g. RSRP) based on the relay discovery solicitation message (1014). The relay UE 1002 may enclose information corresponding to the receive power measurements in a relay discovery response message transmitted to remote UE 1004 (1010). The remote UE 1004 may use the received receive power measurements to determine or estimate the pathloss (associated with remote UE to relay UE transmissions). Optionally, the relay UE 1002 may also include information indicative of its TX power to enable the remote UE 1004 to estimate the pathloss in both directions (e.g. relay UE 1002 to remote UE 1004 and remote UE 1004 to relay UE 1002).

The discovery receive power (e.g. RSRP) may be measured based on the same DMRS symbols in PSSCH for SL-RSRP (for both 1050 and 1052). Discovery messages from relay UE 1002 may also contain additional information to enable remote UE 1004 to assess other relay capabilities (or capability aspects) such as power class information and any other information indicating whether any power limits (power headroom) apply to relay UE 1002. It may also include information indicative of Uu-link quality (where Uu is the wireless communication link between UE and a base station).

Additional sidelink receive power (e.g. SL-RSRP) measurement based evaluations of pathloss may also be implemented. According to some embodiments, PC5 pathloss may be determined/calibrated/evaluated based on SL-RSRP measured at the relay UE. For example, sidelink receive power (e.g. SL-RSRP) measurements reported in a sidelink measurement report (from relay UE to remote UE) may be used, assuming there is ongoing sidelink unicast traffic in the direction from the remote UE to relay UE. According to some embodiments, the PC5 pathloss may be determined/calibrated/evaluated based on sidelink receive power (e.g. SL-RSRP) measured at the remote UE. The remote UE may send a signaling message (e.g. a PC5-RRC or MAC-CE signaling message) requesting the relay UE to provide its TX power information. The TX power information (as a single piece of information or as a sequence of multiple pieces of information) with timestamp may be provided by the relay UE via PC5 higher layer signaling (e.g. PC5-RRC signaling) or as a PC5 MAC-CE (Media Access Control—Control Element). The Remote UE may use the TX power information and its measured sidelink receive power (e.g. SL-RSRP) to derive the pathloss. In some cases sidelink receive power measurements may not be used at all. For example, when there is no traffic, the remote UE may transmit a PC5 higher layer (e.g., PC5-RRC) or a PC5-S message to the relay UE in order to trigger a discovery announcement broadcast, which may lead to Model A Discovery 1050 as illustrated in FIG. 10. Alternately, the remote UE may transmit a solicitation message as illustrated in Model B Discovery 1052 also illustrated in FIG. 10.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A remote user equipment device (UE) comprising:
   radio circuitry configured to enable wireless communications of the remote UE; and
   a processor communicatively coupled to the radio circuitry and configured to cooperate with the radio circuitry to:
      receive, via a sidelink discovery signal from a relay UE, a message comprising:
         first information representative of a transmit power of the relay UE; and
         second information representative of a first measured receive signal power of a sidelink solicitation signal received from the remote UE by the relay UE;
      measure a second receive signal power of the sidelink discovery signal;
      determine a sidelink pathloss for a direction of remote UE to relay UE transmission based on at least one of the first information or the second information and a transmit power of the sidelink solicitation signal; and
      determine a sidelink pathloss for a direction of relay UE to remote UE transmissions based on the first information and the measured second receive signal power.

2. The remote UE of claim 1,
   wherein the message further includes one or more of:
      power class information corresponding to the relay UE;
      information indicating whether the relay UE is subject to a power limit;
      information representative of a link quality between the relay UE and a cellular base station; or
      third information indicating whether the transmit power of the relay UE is statically or dynamically configured.

3. The remote UE of claim 2,
   wherein the processor is configured to further cooperate with the radio circuitry to:
      receive additional messages via corresponding sidelink discovery signals from the relay UE, wherein information representative of the transmit power of the relay UE is included in select ones and not all of the additional messages when the transmit power of the relay UE is statically configured.

4. The remote UE of claim 3,
   wherein the processor is configured to further cooperate with the radio circuitry to:
      in response to the third information indicating that the transmit power of the relay UE is statically configured, use the first information to determine the sidelink pathloss until one of the additional messages includes updated information representative of the transmit power of the relay UE; and
      use the updated information to determine the sidelink pathloss in response to receiving the updated information.

5. The remote UE of claim 3,
   wherein the select ones of the additional messages are determined based on one of:
      an elapsed time since information representative of the transmit power of the relay UE was last received by the remote UE; or
      a number of additional messages received by the remote UE subsequent to receiving information representative of the transmit power of the relay UE.

6. A non-transitory memory element storing instructions executable by a processor to control a remote user equipment device (UE) to:
   receive, via a sidelink discovery signal from a relay UE, a message comprising:
      first information representative of a transmit power of the relay UE; and
      second information representative of a first measured receive signal power of a sidelink solicitation signal received from the remote UE by the relay UE;
   measure a second receive signal power of the sidelink discovery signal;
   determine a sidelink pathloss for a direction of remote UE to relay UE transmission based on at least one of the first information or the second information and a transmit power of the sidelink solicitation signal; and
   determine a sidelink pathloss for a direction of relay UE to remote UE transmissions based on the first information and the measured second receive signal power.

7. The non-transitory memory element of claim 6, wherein the second receive signal power is measured based on a same demodulation reference signal symbols in a physical sidelink shared channel for sidelink reference signal receive power.

8. The non-transitory memory element of claim 6, wherein the instructions are executable by the processor to further control the remote UE to:
receive the sidelink discovery signal in response to the sidelink solicitation signal.

9. The non-transitory memory element of claim 6, wherein the sidelink solicitation signal is transmitted as one of:
a sidelink media access control (MAC) control element (CE) signal; or
a sidelink radio resource control signal.

10. The non-transitory memory element of claim 6, wherein the first information is provided via one of:
sidelink higher layer signaling; or
a sidelink media access control (MAC) control element (CE).

11. A method, comprising:
receiving, via a sidelink discovery signal from a relay user equipment (UE), a message comprising:
first information representative of a transmit power of the relay UE; and
second information representative of a first measured receive signal power of a sidelink solicitation signal received from a remote UE by the relay UE;
measuring a second receive signal power of the sidelink discovery signal;
determining a sidelink pathloss for a direction of remote UE to relay UE transmission based on the second information and a transmit power of the sidelink solicitation signal; and
determining a sidelink pathloss for a direction of relay UE to remote UE transmissions based on the first information and the measured second receive signal power.

12. The method of claim 11, wherein the second receive signal power is measured based on a same demodulation reference signal symbols in a physical sidelink shared channel for sidelink reference signal receive power.

13. The method of claim 11, further comprising:
receiving the sidelink discovery signal in response to the sidelink solicitation signal.

14. The method of claim 11, wherein the message further includes:
third information indicating whether the transmit power of the relay UE is statically or dynamically configured.

15. The method of claim 14, further comprising:
receiving additional messages via corresponding sidelink discovery signals from the relay UE, wherein information representative of the transmit power of the relay UE is included in select ones and not all of the additional messages when the transmit power of the relay UE is statically configured.

16. The method of claim 15, further comprising:
in response to the third information indicating that the transmit power of the relay UE is statically configured, using the first information to determine the sidelink pathloss until one of the additional messages includes updated information representative of the transmit power of the relay UE; and
using the updated information to determine the sidelink pathloss in response to receiving the updated information.

17. The method of claim 15, wherein the select ones of the additional messages are determined based on one of:
an elapsed time since information representative of the transmit power of the relay UE was last received by the remote UE; or
a number of additional messages received by the remote UE subsequent to receiving information representative of the transmit power of the relay UE.

18. The method of claim 11, wherein the message further includes one or more of:
power class information corresponding to the relay UE;
information indicating whether the relay UE is subject to a power limit; or
information representative of a link quality between the relay UE and a cellular base station.

19. The method of claim 11, wherein the sidelink solicitation signal is transmitted as one of:
a sidelink media access control (MAC) control element (CE) signal; or
a sidelink radio resource control signal.

20. The method of claim 11, wherein the first information is provided via one of:
sidelink higher layer signaling; or
a sidelink media access control (MAC) control element (CE).

* * * * *